US012700691B2

(12) United States Patent
Landinger

(10) Patent No.: US 12,700,691 B2
(45) Date of Patent: Aug. 4, 2026

(54) FLEXIBLE HIGH-POWER RF LINE WITH JOINTS

(71) Applicant: SPINNER GmbH, Munich (DE)

(72) Inventor: Josef Landinger, Aschau (DE)

(73) Assignee: SPINNER GMBH, Munich (DE)

(*) Notice: Subject to any disclaimer, the term of this patent is extended or adjusted under 35 U.S.C. 154(b) by 0 days.

(21) Appl. No.: 19/063,121

(22) Filed: Feb. 25, 2025

(65) Prior Publication Data

US 2025/0279605 A1 Sep. 4, 2025

(30) Foreign Application Priority Data

Mar. 1, 2024 (EP) .................................... 24160900

(51) Int. Cl.

*H01R 13/18* (2006.01)
*H01R 13/20* (2006.01)
*H01R 24/54* (2011.01)

(52) U.S. Cl.

CPC ............. *H01R 13/18* (2013.01); *H01R 13/20* (2013.01); *H01R 24/545* (2013.01)

(58) Field of Classification Search

None

See application file for complete search history.

(56) References Cited

U.S. PATENT DOCUMENTS

| | | | | |
|---|---|---|---|---|
| 1,911,395 A * | 5/1933 | Rowley | H01R 13/20 | 439/8 |
| 2,519,933 A * | 8/1950 | Rouault | H01P 1/064 | 439/8 |
| 5,980,290 A * | 11/1999 | Meynier | H01R 13/6315 | 439/246 |
| 2009/0149086 A1* | 6/2009 | Dahms | H01R 24/50 | 439/835 |
| 2014/0127940 A1* | 5/2014 | Wagner | H01R 24/40 | 439/578 |

FOREIGN PATENT DOCUMENTS

| | | |
|---|---|---|
| CN | 103337704 A | 10/2013 |
| CN | 103378429 A | 10/2013 |
| CN | 112421298 A | 2/2021 |
| EP | 3300535 A1 | 4/2018 |

* cited by examiner

*Primary Examiner* — Oscar C Jimenez
(74) *Attorney, Agent, or Firm* — Quarles & Brady LLP; Yakov S. Sidorin

(57) ABSTRACT

A tiltable RF joint for high power coaxial RF lines includes a first outer conductor with a first inner conductor centered therein and a second outer conductor with a second inner conductor centered therein. The first inner conductor that contains a joint socket is mechanically coupled to a joint ball of the second inner conductor and forms a socket-ball connection. The first inner conductor also contains a center contact surface that is shaped as a spherical segment and that is in contact with a center contact spring of the second inner conductor. Any one of the outer conductors has an outer conductor contact spring that is in contact with an outer conductor contact surface at the other outer conductor.

10 Claims, 5 Drawing Sheets

FLEXIBLE HIGH-POWER RF LINE WITH JOINTS

CROSS-REFERENCE TO RELATED APPLICATIONS

This US Patent application claims priority to the pending European Application No. 24160900.7 filed on Mar. 1, 2024, the disclosure of which is incorporated herein by reference.

BACKGROUND

1. Field of the Invention

The invention relates to tiltable and/or rotatable joints for high power coaxial RF lines and flexible high power RF lines with joints.

2. Description of the Related Art

For a connection between high power RF devices like power transmitters and loads sometimes a certain degree of flexibility is required. A coaxial RF connector system for connecting cables is disclosed in EP 3 300 535 A1. This connector system can couple comparatively high RF power up to a few Kilowatts. For higher power levels larger connectors and larger diameter cables are required. Such cables are comparatively inflexible and require high forces for disconnecting the connectors and removing the cables or components attached to the cables.

SUMMARY OF THE INVENTION

The embodiments are providing tiltable and/or rotatable joints for high power coaxial RF lines and an RF connecting system which is capable of transferring high power RF signals in the range of many Kilowatts and above in a broad frequency range between DC and 3.5 GHz, but not limited to that range.

In an embodiment, a tiltable and/or rotatable RF joint for high power coaxial RF lines includes a first outer conductor and a second outer conductor. A first inner conductor is centered within the first outer conductor and has a first center axis. A second inner conductor is centered within the second outer conductor and has a second center axis. The first center axis and the second center axis may identify or define the same center axis of the tiltable RF joint when the tiltable RF joint is straight (not tilted). The first inner conductor has a joint socket mechanically coupled to a joint ball of the second inner conductor, forming a socket-ball connection. This socket-ball connection may allow a tilt or rotation in at least one axis or in two axes orthogonal to each other and relative to the corresponding center axis of at least one of the inner conductors. A first tilt may be in a plane through said center axis of the tiltable RF joint while a second tilt may be orthogonal to said plane. Further, there may be a rotation around said center axis of the tiltable RF joint. The socket-ball connection may further allow a limited axial movement. There may be any combination of the directions of tilt, rotation and linear displacement. This kind of tiltable/rotatable RF joint may also be referred to as a ball joint. Herein, for simplicity, reference is made to a tiltable joint, which means the tiltable, rotatable, displaceable joint mentioned above. The socket may have a locking means, which may hold the ball at the socket and/or restrict axial movement.

Generally, the RF joint is formed with respect to a center axis (of such RF joint) that is defined by either a first inner conductor or a second inner conductor configured for at least one of:

- tilt in a plane through the center axis of the RF joint,
- tilt orthogonal to the plane through the center axis of the RF joint,
- rotation around the center axis of the RF joint,
- extension or reduction in length along the center axis of the RF joint.

While the socket-ball connection may have a mechanical function, electrical contact means are provided for inner conductor contacting. The first inner conductor may have a center contact surface further having the shape of a spherical segment, which is in contact with a center contact spring at the second inner conductor. The center contact spring may be a hollow body which may further include a plurality of slots. It may have a hollow cylindrical or spherical shape or a segment thereof. It may touch the center contact surface from its outside. The center contact surface may be at the outside of the joint socket. The center contact surface may have the shape of a spherical segment with a center point at the center point of the joint ball. This provides a constant radius of the spring and therefore a constant spring force over tilting.

To provide an electrical contact between the outer conductors, the first outer conductor may have an outer conductor contact spring which is in contact with an outer conductor contact surface at the second outer conductor. This may also be reversed, such that the second outer conductor may have an outer conductor contact spring which is in contact with an outer conductor contact surface at the first outer conductor. The outer conductor contact spring may be a hollow body. It may have a hollow cylindrical or spherical shape. It may touch the outer conductor contact surface from its inner side. The outer conductor contact surface may have a hollow spherical shape or a segment thereof, which may have a center point at the center point of the joint ball. This provides a constant radius of the spring and therefore a constant spring force over tilting.

To enclose the tiltable RF joint and protect its interior from the environment, the outer conductors may overlap each other. The second outer conductor may have an outer bearing surface, which may have the shape of a spherical segment. This may be overlapped by an inner bearing surface of the first outer conductor. This order may also be reversed, such that the first outer conductor may have an outer bearing surface, which may have the shape of a spherical segment, and this may be overlapped by an inner bearing surface of the second outer conductor. The overlapping surface may also have a shape of a spherical segment. The outer bearing surface may have a convex shape while the inner bearing surface may either have a concave or a convex surface.

To hold the inner conductors in place at a center position within the outer conductors, at least one spacer may be provided between an inner conductor and its outer conductor. There may be a first spacer between the first inner conductor and the first outer conductor. Further, a second spacer may be provided between the second inner conductor and the second outer conductor.

The angle of tilt of a tiltable RF joint may be restricted in any direction withing a range of ±60° or less, e.g. ±45° or ±30°. There is no need for restricting the angle of rotation around the center axis, but it may be restricted to 360° or less, 180° or less or 90° or less. A linear displacement may be restricted to 20 mm or less, 10 mm or less, or 5 mm or less. It may also be restricted to a values smaller than 1 mm. The inner conductors may have a diameter in a range from 5 mm to 500 mm or 10 mm to 50 mm. The outer conductors may have a diameter between 2 to 5 times larger than the inner conductors.

A joint component may include a tiltable RF joint as described above. It may further include electrical contacting means, e.g. inner conductor contacts and/or mechanical attachment means, e.g. a connection flange and/or at least one elongated conductor section including corresponding outer and inner conductors. The inner conductor contacts may be pins or sockets. They may include at least one spring.

In an embodiment, a joint component may include multiple tiltable RF joints connected in series. This allows for a higher degree in mechanical flexibility. There may be 2, 3, 4 or more such tiltable RF joint connected together.

In a specific embodiment, a joint component may include two tiltable RF joints connected in series and mirrored to each other such that e.g. both second inner conductors are connected together. This has the benefit, that the joint balls of both tiltable RF joints can be held by a common joint ball locking means, which simplifies assembly. Multiples of such joint components may be connected together for further increasing flexibility.

An RF connecting system may include a plurality of joint components connected together. Further, at least one of a straight, curved or cornered conductor component may be added. Such a conductor component may include an outer conductor and an inne conductor centered within the outer conductor. A cornered conductor component, also called elbow may have a 90° angle, but other angles e.g. 60° or 45° or any value in between are possible.

BRIEF DESCRIPTION OF THE DRAWINGS

In the following, the invention will be described by way of example, without limitation of the general inventive concept, on examples of embodiment and with reference to the drawings.

Figure 1:
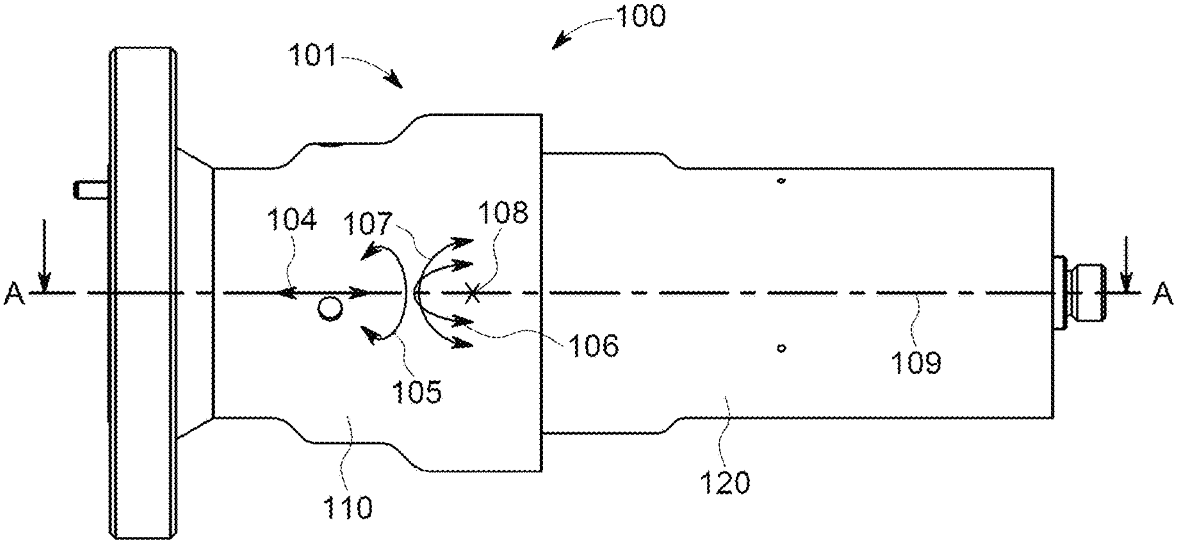
FIG. 1 shows a line section with a single tiltable RF joint.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

FIG. 1 shows an embodiment of a first joint component with a single ball joint. The first joint component 100 includes a tiltable RF joint 101. The first joint component 100 has a first joint center axis 109 and a center of ball joint 108 on the first joint center axis 109. A first section, e.g., comprising first outer conductor 110 may be tilted against a second section, e.g., comprising second outer conductor 120. There may a be a first direction of tilt, orthogonal to the drawing plane 106 and a second direction of tilt in the drawing plane 107. Herein tilt may be a rotational movement within a restricted range of angles. Further, there may be a rotation 105 around the first joint center axis 109 and/or a linear displacement 104 along the first joint center axis 109. There may be any combination of the directions of tilt, rotation and linear displacement. Generally, each of the joint components may have its own center axis. In the embodiment shown, the joint component forms a straight line such that both center axis is the same.

Figure 2:
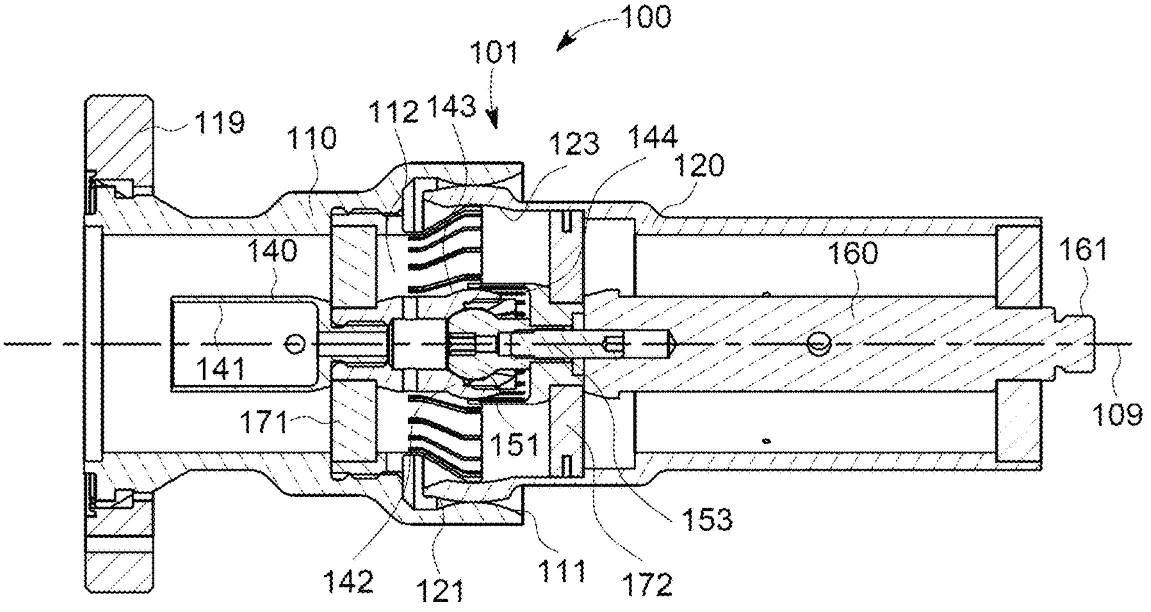
FIG. 2 shows a sectional view of the line section with a single tiltable RF joint.

FIG. 2 shows a sectional view of the first joint component 100 of FIG. 1. Its first section includes a first outer conductor 110 having an inner bearing surface 111 which may be in mechanical contact with an outer bearing surface 121 of the second section which includes a second outer conductor 120. Such a mechanical contact is not required but may increase stability and can help sealing of the inner components. The first section further includes an outer conductor contact spring 112 forming an electrical contact with an outer conductor surface 123 of the second section. This establishes a continuous electrical connection between the outer conductors of the first section and the second section.

The first section further includes a first inner conductor 140 having a first inner conductor contact 141 for external contacting the joint section. The first inner conductor 140 further includes a joint socket 142 which is in mechanical contact with a joint ball 151 of the second section forming a socket-ball connection which basically allows tilting between the sections. A center contact surface 143 at the first section is contacted by a center contact spring 144 of the second section. The joint ball 151 may be locked by a joint ball locking means 153 which may be a screw and allows easy assembly and disassembly of the sections.

In the second section, a second inner conductor 160 having a second inner conductor contact 161 may be connected to the joint ball 151 and the center contact spring 144, which may include a plurality of slots.

For holding the inner conductors in place at a center position within the outer conductors, a first spacer 171 may be provided between the first inner conductor 140 and the first outer conductor 110. Further, a second spacer 172 and a third spacer 173 may be provided between the second inner conductor 160 and the second outer conductor 120.

For mechanically mounting and connecting of the outer conductors, a first connection flange 119 may be provided at the first outer conductor 110.

Figure 3:
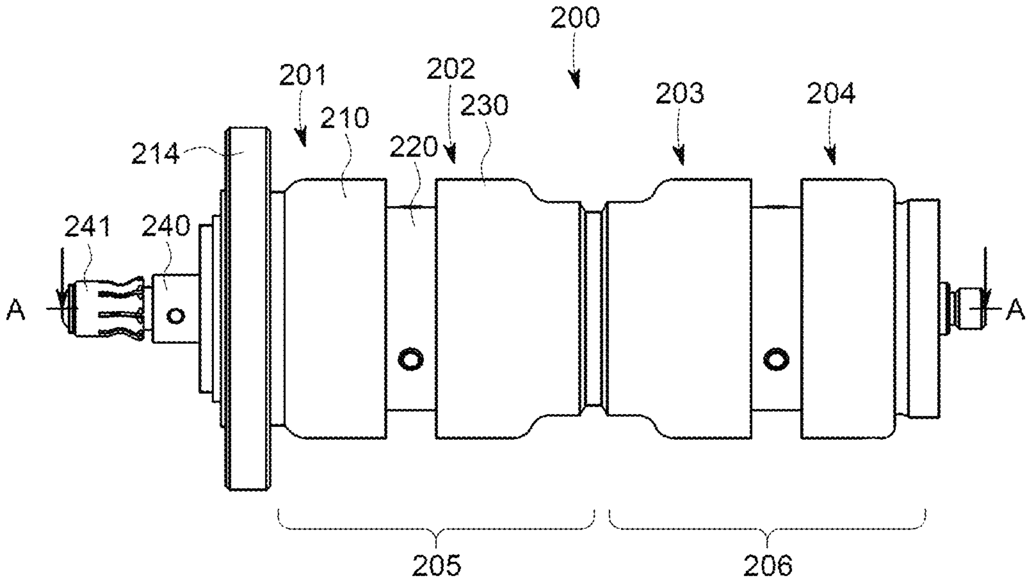
FIG. 3 shows a line section with two dual tiltable RF joints.

FIG. 3 shows a line section with two dual tiltable RF joints. The second joint component 200 includes a first tiltable RF joint 201, a second tiltable RF joint 202, a third tiltable RF joint 203 and a fourth tiltable RF joint 204. Basically, all these tiltable RF joint are configured like the tiltable RF joint 101 of first joint component 100. The first tiltable RF joint 201 and second tiltable RF joint 202 form a first joint assembly 205. The third tiltable RF joint 203 and fourth tiltable RF joint 204 form a second joint assembly 206. As the second joint assembly 206 is basically identical to the first joint assembly 205, herein only the first joint assembly 205 is described in detail. The second joint component 200 has a second joint center axis 209.

The second joint component is a dual joint component which basically includes two joints of the first joint component in a mirrored arrangement. For better readability, the parts of the first joint are denoted by "A" whereas the parts of the second (mirrored) joint are denoted as "B". The second joint component has a first inner conductor A 240 further having a first inner conductor A contact 241. A second connection flange 219 may be provided for electrically and mechanically connecting the second joint component 200. For holding the inner conductors in place relative to the outer conductors, a first spacer 271 may be between first inner conductor A 240 and first outer conductor A 210. There may be second spacers 272 between a dual second inner conductor 250 and a dual second outer conductor 220. Further, there may be a third spacer 273 between first inner conductor B 260 and first outer conductor B 230.

Further details are described in an enlarged view of the next figure.

Figure 4:
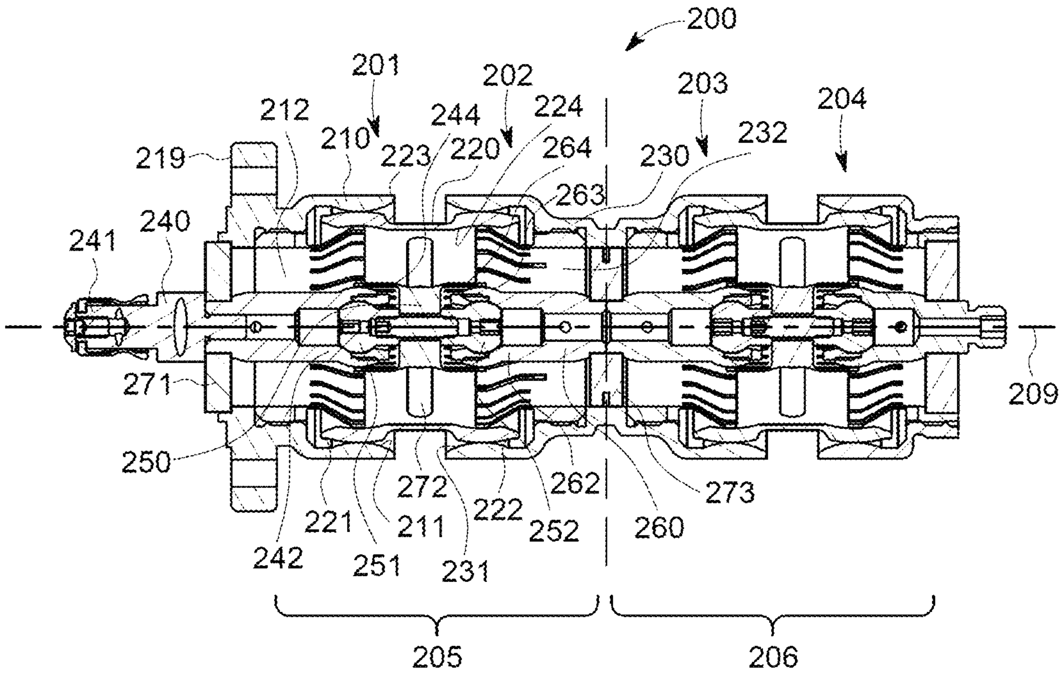
FIG. 4 shows a sectional view of the line section with two tiltable RF joints.
Figure 5:
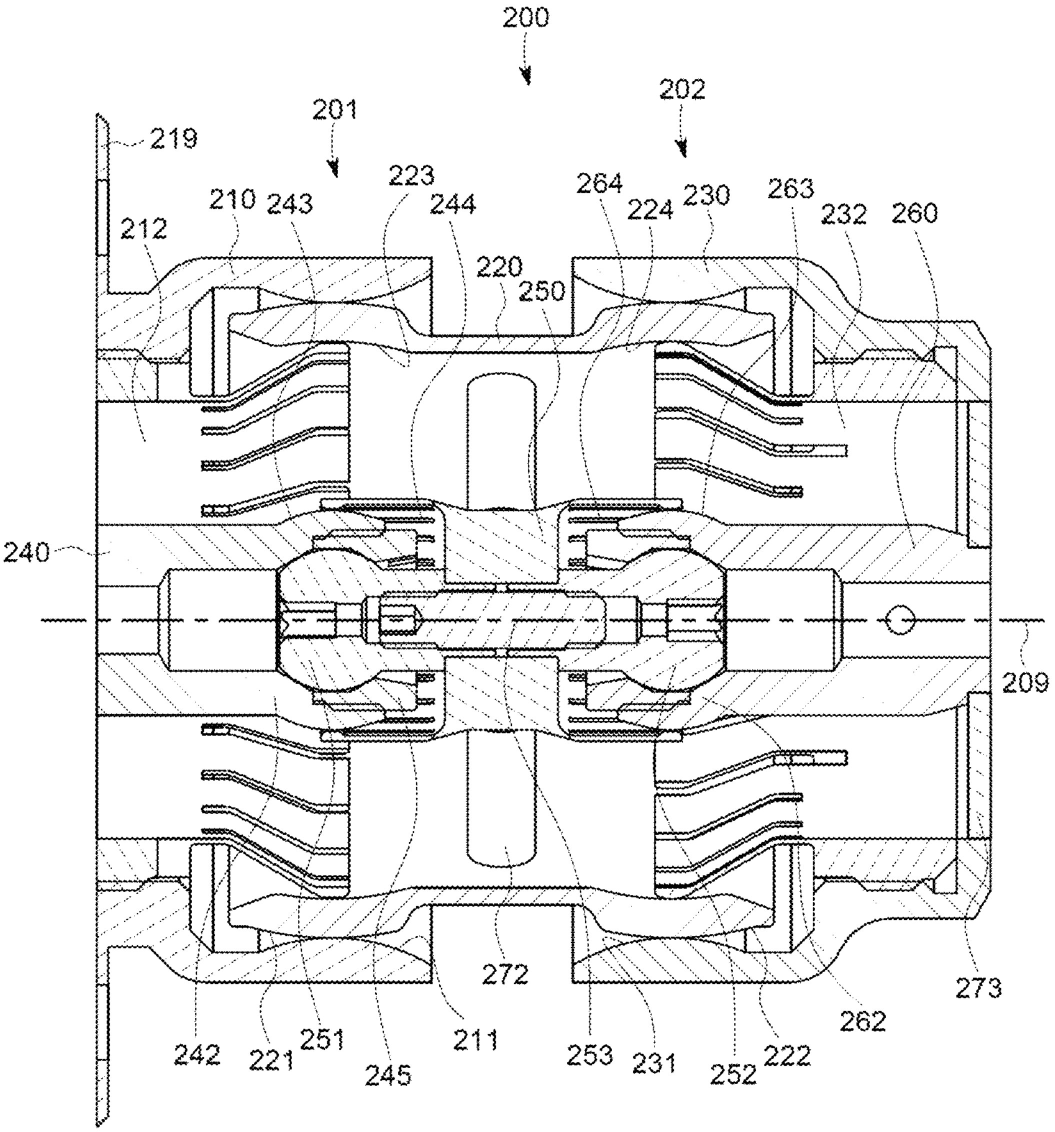
FIG. 5 shows an enlarged section of FIG. 4.

FIG. 5 shows an enlarged section of FIG. 4. Here, details of the first tiltable RF joint 201 and the second tiltable RF joint 202 are shown. The second tiltable RF joint 202 is basically mirrored to the first tiltable RF joint 201. A first outer conductor A 210 has an inner bearing surface A 211 which may be in contact with an outer bearing surface A 221 of a dual second outer conductor 220. An outer conductor contact spring A 212 may be in mechanical and electrical contact with outer conductor contact surface A 223 of dual second outer conductor 220. The first inner conductor A 240 may include a joint socket 242 that is forming a socket ball connection with joint ball A 251 being part of a dual second inner conductor 250. This socket ball connection primarily has a mechanical function and defines the center of tilt or rotation. The socket may have an elongated shape, such that the ball may also be displaced in an axial direction. The socket may have a locking means 245, which may hold the ball at the socket and/or restrict axial movement. For electrical connection of the inner conductors, the first inner conductor A 240 has a center contact surface A 243 which may be in electrical and mechanical contact with a center contact spring A 244.

The second tiltable RF joint 202 in this embodiment is basically a mirrored version of the first tiltable RF joint 201. The second tiltable RF joint 202 has a first outer conductor B 230 forming an inner bearing surface B 231 which may be in mechanical contact with an outer bearing surface B 222 of the dual second inner conductor 250. The second tiltable RF joint 202 may further include an outer conductor contact spring B 232 which may be in electrical and mechanical contact with an outer conductor contact surface B 224 of the dual second inner conductor 250. A socket ball connection is defined by a joint socket B 262 being part of the first inner conductor B 260 and a joint ball B 252 being part of the dual second inner conductor 250. The joint ball B 252 may be locked with the joint ball A 251 to the dual second inner conductor 250 by a second and joint ball locking means 253. An electrical center contact is established by a center contact spring B 264 being part of the dual second inner conductor 250 which is further in contact with a center contact surface B 263 being part of the first inner conductor B 260.

Figure 6:
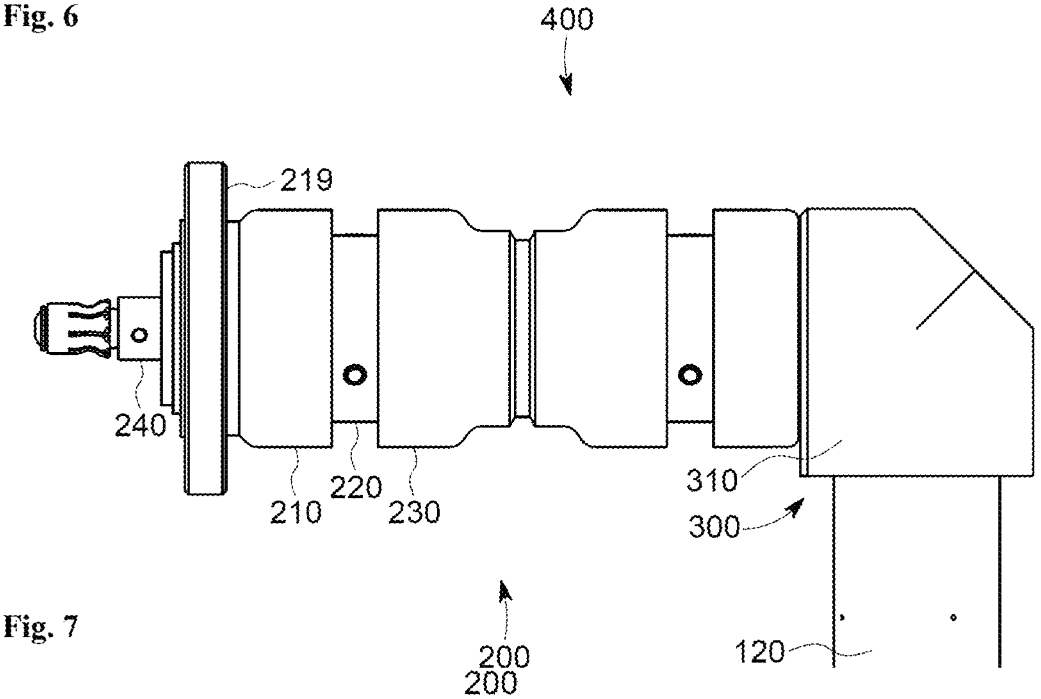
FIG. 6 shows a side view of a RF connecting system.

FIG. 6 shows a side view of an RF connecting system. An exemplary embodiment of a RF connecting system 400 includes a first joint component 100, a second joint component 200 and a corner section 300 with a corner outer conductor 310.

Figure 7:
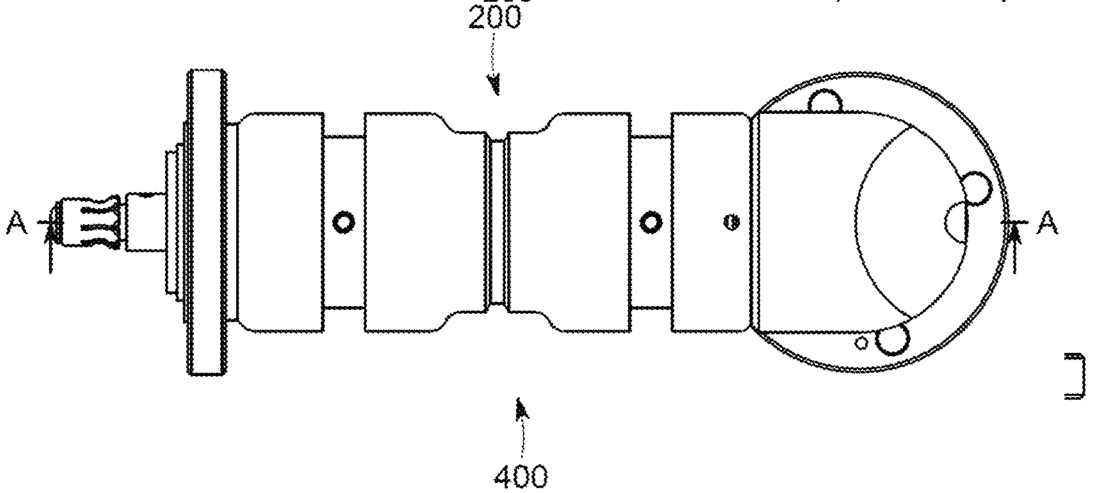
FIG. 7 shows a sectional view of a RF connecting system.

FIG. 7 shows a top view of an RF connecting system 400.

Figure 8:
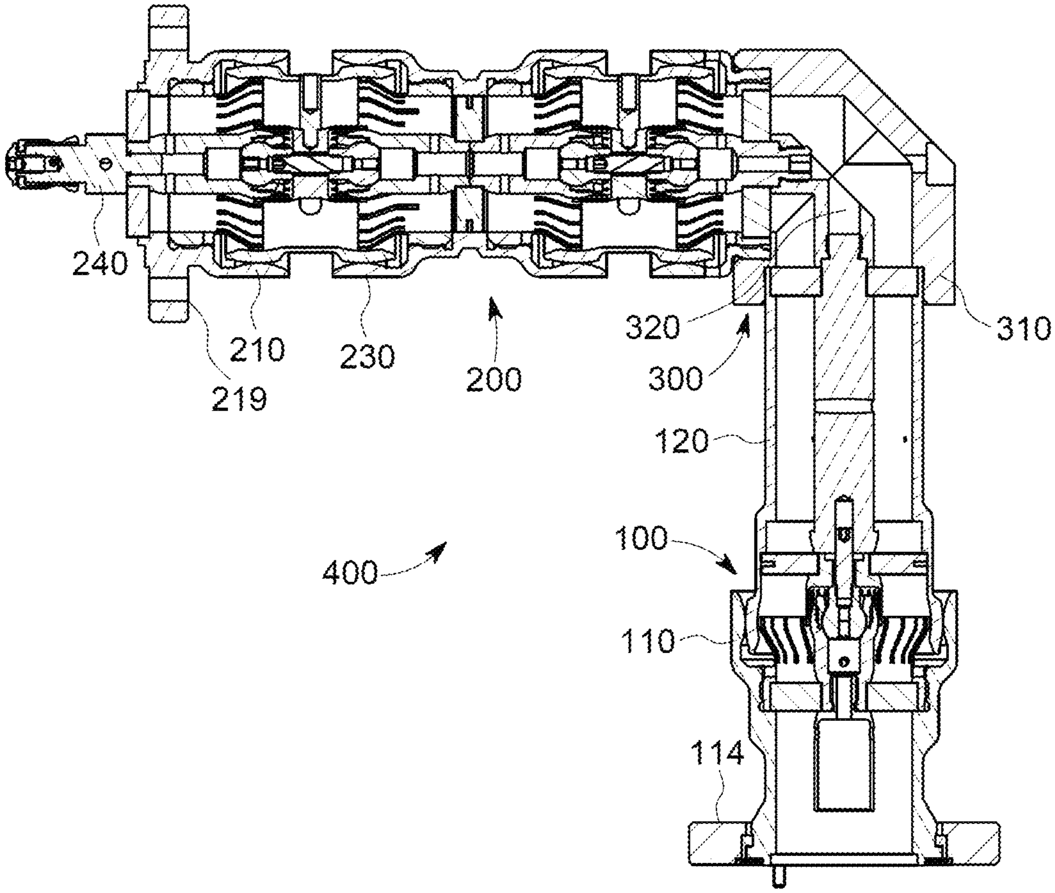
FIG. 8 shows a top view of a RF connecting system.

FIG. 8 shows a sectional view of an RF connecting system 400. In this figure, basically the internal components can be seen. Details of the internal components have been explained in the previous figures. Here, further a corner inner conductor 320 of the corner section 300 is shown.

Figure 9:
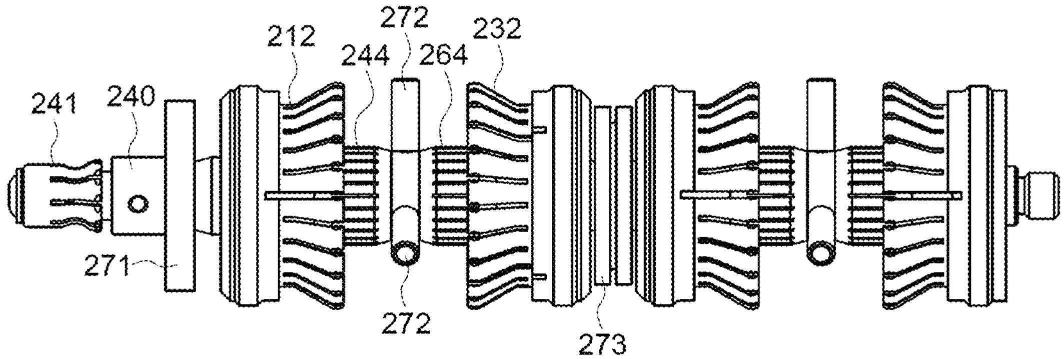
FIG. 9 shows the contact springs of the second tiltable RF joint.

In FIG. 9, the contact springs of the second joint component 200 are shown in more detail. The outer conductor contact spring A 212 and the outer conductor contact spring B 232 are part of the first joint assembly 205. They have outward directed spring elements, which are configured to press against the outer conductor contact surface A 223 and the outer conductor contact surface B 224. Due to the outwardly extending shape, they can maintain an electrical contact even through a tilting movement. The center contact spring A 244 and the center contact spring B 264 are configured to contact the center contact surface A 243 and the center contact surface B 263. Instead of a single spacer, there may be a plurality of second spacers 272 or spacer sections arranged between the center contact spring A 244 and the center contact spring B 264, for holding dual second inner conductor 250 in a defined position within the dual second outer conductor 220.

It will be appreciated to those skilled in the art having the benefit of this disclosure that this invention is believed to provide RF joints and components. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

100 first joint component
101 tiltable RF joint
104 direction of linear movement
105 direction of rotation
106 direction of tilt orthogonal to the drawing plane
107 direction of tilt in the drawing plane
108 center of ball joint
109 first joint center axis
110 first outer conductor
111 inner bearing surface
112 outer conductor contact spring
119 first connection flange
120 second outer conductor
121 outer bearing surface
123 outer conductor contact surface
140 first inner conductor
141 first inner conductor contact

142 joint socket
143 center contact surface
144 center contact spring
151 joint ball
153 joint ball locking means
160 second inner conductor
161 second inner conductor contact
171 first spacer
172 second spacer
173 third spacer
200 second joint component
201 first tiltable RF joint
202 second tiltable RF joint
203 third tiltable RF joint
204 fourth tiltable RF joint
205 first joint assembly
206 second joint assembly
209 second joint center axis
210 first outer conductor A
211 inner bearing surface A
212 outer conductor contact spring A
219 second connection flange
220 dual second outer conductor
221 outer bearing surface A
222 outer bearing surface B
223 outer conductor contact surface A
224 outer conductor contact surface B
230 first outer conductor B
231 inner bearing surface B
232 outer conductor contact spring B
240 first inner conductor A
241 first inner conductor contact
242 joint socket A
243 center contact surface A
244 center contact spring A
245 locking means
250 dual second inner conductor
251 joint ball A
252 joint ball B
253 joint ball locking means
260 first inner conductor B
262 joint socket B
263 center contact surface B
264 center contact spring B
271 first spacer
272 second spacers
273 third spacer
300 corner component
310 corner outer conductor
320 corner inner conductor
400 RF connecting system

The invention claimed is:

1. An RF joint for high power coaxial RF lines, the RF joint comprising:

a first outer conductor with a first inner conductor centered therein, a second outer conductor with a second inner conductor centered therein, the first inner conductor comprising a joint socket being mechanically coupled to a joint ball of the second inner conductor and forming a socket-ball connection, the first inner conductor further comprising a center contact surface having a shape of a spherical segment, the center contact surface further being in contact with a center contact spring of the second inner conductor, wherein:

the first outer conductor has an outer conductor contact spring, that is which is in contact with an outer conductor contact surface at the second outer conductor, or the second outer conductor has an outer conductor contact spring, which is in contact with an outer conductor contact surface at the first outer conductor.

2. The RF joint according to claim 1, wherein the second outer conductor has an outer bearing surface, which is overlapped by an inner bearing surface of the first outer conductor.

3. The RF joint according to claim 1, comprising a spacer between the first inner conductor and the first outer conductor.

4. The RF joint according to claim 1, comprising a spacer between the second inner conductor and the second outer conductor.

5. The RF joint according to claim 1, wherein the center contact surface has the shape of the spherical segment with a center point at a center point of the joint ball of the second inner conductor.

6. The RF joint according to claim 1, wherein the outer conductor contact surface has a hollow spherical shape or a segment thereof, wherein the hollow spherical shape or the segment thereof has a center point at a center point of the joint ball of the second inner conductor.

7. The RF joint according to claim 1, wherein the RF joint is structured with respect to a center axis of the RF joint that is defined by either the first inner conductor or the second inner conductor and is configured to perform at least one of:

tilting in a plane through the center axis of the RF joint, tilting orthogonally to the plane through the center axis of the RF joint, rotating around the center axis of the RF joint, extending or reducing its length along the center axis of the RF joint.

8. An RF joint component including at least one RF joint according to claim 1, further comprising at least one of:

an inner conductor contact, a connection flange, and an elongated conductor section including corresponding outer and inner conductors.

9. The RF joint component according to claim 8, wherein the at least one RF joint includes two of said RF joints that are connected in series and mirrored to each other.

10. An RF connecting system including at least two of the RF joint components according to claim 8 connected together, and further comprising:

at least one straight, curved, or cornered conductor component that includes an outer conductor and an inner conductor centered within the outer conductor.

* * * * *